US008984596B2

(12) United States Patent
Griffin (10) Patent No.: US 8,984,596 B2
(45) Date of Patent: Mar. 17, 2015

(54) ELECTRONIC DEVICE FOR DISPLAYING A PLURALITY OF WEB LINKS BASED UPON FINGER AUTHENTICATION AND ASSOCIATED METHODS

(75) Inventor: Stephanie Griffin, Melbourne Beach, FL (US)

(73) Assignee: Authentec, Inc., Melbourne, FL (US)

( * ) Notice: Subject to any disclaimer, the term of this patent is extended or adjusted under 35 U.S.C. 154(b) by 789 days.

(21) Appl. No.: 12/570,647

(22) Filed: Sep. 30, 2009

(65) Prior Publication Data

US 2011/0078771 A1 Mar. 31, 2011

(51) Int. Cl.
*H04L 29/06* (2006.01)
*G06F 21/32* (2013.01)

(52) U.S. Cl.
CPC ..................... *G06F 21/32* (2013.01)
USPC ......... 726/5; 726/1; 726/9; 726/12; 340/5.83; 709/203

(58) Field of Classification Search
USPC .................... 726/5; 705/50, 67; 382/124, 115
See application file for complete search history.

(56) References Cited

U.S. PATENT DOCUMENTS

| | | | |
|---|---|---|---|
| 4,792,226 A | 12/1988 | Fishbine et al. | |
| 7,003,670 B2 | 2/2006 | Heaven et al. | |
| 7,571,850 B2 | 8/2009 | Barcelou | 235/379 |
| 7,941,370 B2* | 5/2011 | Paulsen et al. | 705/39 |
| 8,336,096 B2* | 12/2012 | Narusawa et al. | 726/19 |
| 2003/0028811 A1 | 2/2003 | Walker et al. | |
| 2003/0038824 A1 | 2/2003 | Ryder | |
| 2004/0125993 A1* | 7/2004 | Zhao et al. | 382/124 |
| 2005/0169503 A1* | 8/2005 | Howell et al. | 382/115 |
| 2006/0181521 A1 | 8/2006 | Perreault et al. | 345/173 |
| 2009/0172773 A1* | 7/2009 | Moore | 726/1 |
| 2009/0177587 A1 | 7/2009 | Siegal et al. | 705/67 |
| 2010/0146608 A1 | 6/2010 | Batie et al. | 713/186 |
| 2010/0153486 A1* | 6/2010 | Stich et al. | 709/203 |

FOREIGN PATENT DOCUMENTS

GB 2400713 10/2004 ............... G06K 9/00

OTHER PUBLICATIONS

Fingerprint Matching Using Minutiae and Texture Features; Anil Jain et al; Dept. of Computer Science and Engineering; Michigan State University, East Lansing, MI 48824; Proc. of Int'l Conference on Image Processing (ICIP), pp. 282-285, Thessaloniki, Greece, Oct. 7-10, 2001.*
Enhancing security and privacy in biometrics-based authentication systems; Ratha et al; IBM systems Journal, 2001; 21 pages.*
Wikipedia: "RSS", Wikipedia, Sep. 28, 2009, Retrieved from the Internet: URL: http://en.wikipedia.org/w/index.php?title=RSS&oldid=316724186 [retrieved on Dec. 12, 2010].
"Softex OmniPass Mobile Edition Version 3.0 Users' Guide", Softex Incorporated, Document #: SOF-OPME30-UG-1.0, 2003-2005, pp. 1-13.

* cited by examiner

*Primary Examiner* — Jason Lee
(74) *Attorney, Agent, or Firm* — Allen, Dyer, Doppelt, Milbrath & Gilchrist, P.A.

(57) ABSTRACT

An electronic device may include a finger biometric sensor, a display, and a processor coupled with the finger biometric sensor and the display. The processor is capable of displaying a plurality of finger representations on the display corresponding to different fingers of a hand, enrolling respective user's fingers for the plurality of finger representations using the finger biometric sensor, displaying a menu of available functions on the display, associating at least some of the available functions with respective enrolled user's fingers, and performing a given function based upon a match of a newly sensed user's finger with a respective enrolled user's finger using the finger biometric sensor.

18 Claims, 11 Drawing Sheets

ELECTRONIC DEVICE FOR DISPLAYING A PLURALITY OF WEB LINKS BASED UPON FINGER AUTHENTICATION AND ASSOCIATED METHODS

FIELD OF THE INVENTION

The present invention relates to the field of electronic devices, and, more particularly, to electronic devices including finger biometric sensors and related methods.

BACKGROUND OF THE INVENTION

The use of finger biometric sensors for verifying fingerprints has become relatively well known in a variety of applications. For example, some electronic locking systems include finger biometric sensors for identifying and verifying authorized individuals. Likewise, some electronic devices incorporate finger biometric sensors that are used for verifying an authorized user. Such an electronic device may only permit access to authorized users, or may only permit full access to authorized users (allowing unauthorized users to have limited access).

Attempts at using the fingerprint verification capabilities of finger biometric sensors for other related applications have been made. For example, Omni Pass is a software application for a cellular telephone that stores a user's system password for access to the cellular telephone and automatically enters the password for the user based upon verification of the user's finger. In addition, Omni Pass may also store a user's login and password information for a given web site and automatically enter that information for the user based upon verification of the user's finger.

U.S. Pat. Pub. 2005/0169503 to Howell et al. discloses a method of performing a task based upon fingerprint verification. A user's fingerprint is read and compared with enrollment fingerprint images. If a match is found, a task associated with that finger is executed. The task may include launching a word processor, a web site, dialing a phone number, etc.

U.S. Pat. Pub. 2009/0177587 to Siegal et al. discloses a system for verifying a user for the purposes of accessing private financial information in an online environment. The system also facilitates the making of secure payments from an electronic wallet with biometric authentication. In particular, the system includes an electronic device having a finger biometric sensor and a biometric authentication server communicating therewith. The finger biometric sensor scans a user's finger and sends biometric information associated therewith to the biometric authentication server. The biometric authentication server then compares the biometric information from the finger with a biometric information stored in a biometric directory to find a match therebetween. If a match is found, the system facilitates making the secure payment from the electronic wallet.

SUMMARY OF THE INVENTION

In view of the foregoing background, it is therefore an object of the present invention to provide an electronic device having a biometric sensor to provide a more user friendly and convenient way of viewing web links.

An electronic device may include a finger biometric sensor, a display, and a processor coupled with the finger biometric sensor and the display. The processor is capable of displaying a plurality of finger representations on the display corresponding to different fingers of a hand, enrolling respective user's fingers for the plurality of finger representations using the finger biometric sensor, displaying a menu of available functions on the display, associating at least some of the available functions with respective enrolled user's fingers, and performing a given function based upon a match of a newly sensed user's finger with a respective enrolled user's finger using the finger biometric sensor.

More particularly, the menu of available functions may include a plurality of different icons each corresponding to a respective available function. Moreover, the processor may be configured to drag the icon corresponding to a given function to a respective finger representation on the display for association therewith.

The processor may be further configured to display a prompt on the display to place a finger corresponding to a given finger representation adjacent the finger biometric sensor for enrollment. By way of example, the functions may include one or more of opening a Really Simple Syndication (RSS) feed, and opening a Web link (e.g., a Web link for a social networking site).

In accordance with another example, at least one of the functions may comprise purchasing of at least one of goods and services. More particularly, the processor may facilitate purchasing based upon payment account information, and the processor may also associate the payment account information with the authenticated finger.

The processor may also authenticate the newly sensed user's finger by sensing finger biometric verification data using the finger biometric sensor. The finger biometric verification data may be compared to finger biometric enrollment data to determine a match therebetween.

A related method is for using an electronic device comprising a finger biometric sensor and a display. The method may include displaying a plurality of finger representations on the display corresponding to different fingers of a hand, enrolling respective user's fingers for the plurality of finger representations using the finger biometric sensor, displaying a menu of available functions on the display, associating at least some of the available functions with respective enrolled user's fingers, and performing a given function based upon a match of a newly sensed user's finger with a respective enrolled user's finger using the finger biometric sensor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
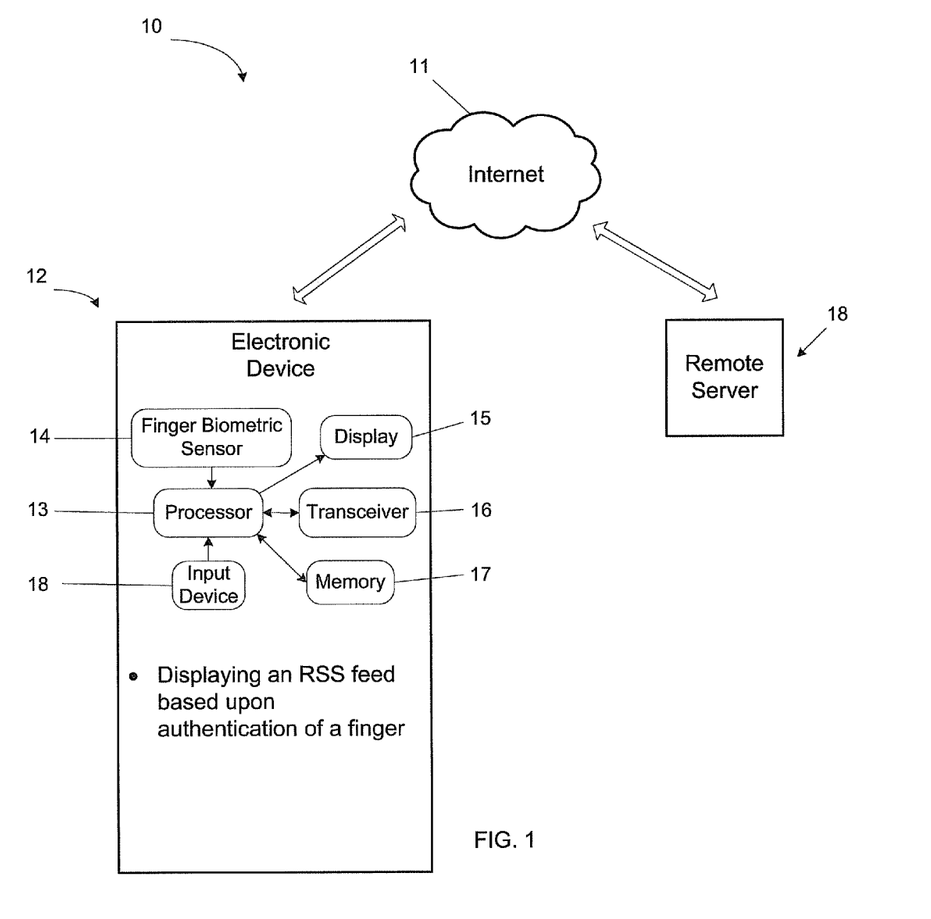
FIG. 1 is a schematic block diagram of a communications system including an electronic device according to the present invention.

Referring initially to FIG. 1, a communications system 10 including an electronic device 12 in accordance with the present invention is now described. The electronic device 12 may be a mobile wireless communications device such as a laptop or cellular telephone. The electronic device 12 may also be a desktop computer, a computer within a vehicle, or other suitable device.

The electronic device 12 includes a processor 13 coupled to a finger biometric sensor 14, a display 15, a transceiver 16, a memory 17, and an input device 18. The finger biometric sensor 14 may be any suitable sensor of any suitable type, such as an electric field sensor, an optical finger sensor, a capacitative finger sensor, or an ultrasonic finger sensor, for example. The finger biometric sensor 14 may typically sense the image of ridges and valleys of a fingerprint, or may image other features of the user's finger, such as pores, or even subdermal features, as will be appreciated by those skilled in the art.

The finger biometric sensor 14 may be sized to receive an entire fingertip thereagainst, or may be smaller and sized to receive a portion of the fingertip. In such a case, the finger biometric sensor 14 may be a slide type finger sensor over which the user slides his finger as will be appreciated by those skilled in the art. In such embodiments, frames of finger biometric data may be captured and processed as a user slides a finger across the finger biometric sensor 14.

The transceiver 16 illustratively cooperates with the processor 13 for communication with a remote server 18 via the Internet 11. This communication may be wireless or wired. If wireless communication is used, the connection between the transceiver 16 and the Internet 11 may be via a cellular network that allows data transmission or via Wi-Fi. The memory 17 may be any suitable memory, or a combination of multiple memories. For example, the memory 17 may include a random access memory (RAM), and a flash RAM or a hard drive.

The input device 18 may be a key, switch, trackball, or other input device. Indeed, the display 15 may be a touch screen display and may serve as the input device 18. Further, the finger biometric sensor 14 may also serve as the input device.

The remote server 18 hosts a web feed of updated content including a plurality of web links. The web feed may be a really simple syndication (RSS) feed, a XML file, or other suitable format, for example.

Figure 2:
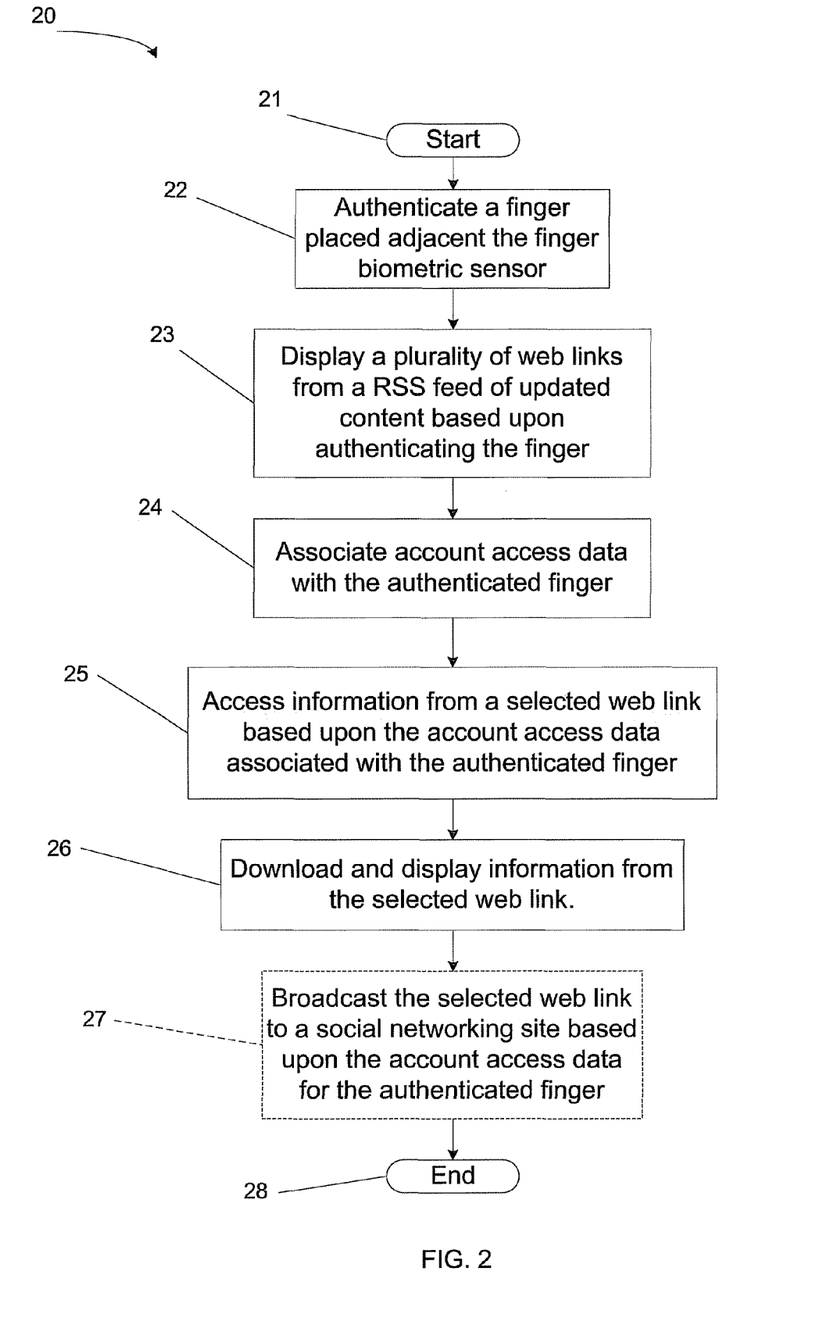
FIG. 2 is a flowchart illustrating operation of the electronic device of FIG. 1.

With additional reference now to the flowchart 20 of FIG. 2, operation of the electronic device 12 is now described. After the start of operation of the device 12 (Block 21), a finger placed adjacent the finger biometric sensor 14 is authenticated (Block 22) by the processor 13.

Next, the processor 13 displays a plurality of web links from a RSS feed (hosted by the remote server 18) on the display 15 based upon authentication of the finger (Block 23). Those skilled in the art will appreciate that the web links may be from an API instead of a RSS feed.

The plurality of web links may be displayed in response to authentication of the identify of the user via the finger biometric sensor 14, so that no web links would be displayed to an unauthorized user, or different web links would be displayed to different users. Additionally or alternatively, the plurality of web links may be displayed in response to authentication of the finger via the finger biometric sensor 14, so that the web links displayed (and/or the web feed accessed) depend upon which finger was placed adjacent the finger biometric sensor 14. For example, authentication of a given user's index finger may result in a plurality of web links of a first RSS feed being displayed, while authentication of that user's thumb may result in a plurality of web links of a second RSS feed being displayed.

Account access data for at least one of the plurality of web links is associated with the authenticated finger (Block 24) by the processor 13. The account access data may include a user name and password, for example. The account access data may also include an account number or any other information used to access an account of the user associated with at least one of the plurality of web links. Those skilled in the art will understand that access data for multiple accounts may be associated with a given authenticated finger, and that some of that access data may be for a web link not included in the plurality thereof.

Information from a selected web link is accessed based upon the account access data associated with the authenticated finger (Block 25) by the processor 13 in cooperation with the transceiver 16. The web link is selected based upon user input received via the input device 18, finger biometric sensor 14, and/or the display 15 (if a touch screen display). The account access data may be communicated to the web site associated with the selected web link upon selection thereof. Alternatively, the finger may be re-authenticated after selection of the web link and the account access data may be communicated to the web site associated with the selected web link thereafter. This advantageously saves time, as the user may not have to manually log into the web site. Moreover, this functionality may be especially desirable if the electronic device 12 is shared by a plurality of users, as any kind of account access data is typically not stored in such a situation.

Information from the selected web link is then downloaded by the transceiver 16 and displayed on the display 15 (Block 26) by the processor 13. That is, the web site associated with the selected web link is loaded and displayed on the display 15. The user may now control the web site in a conventional fashion via the input device 18, finger biometric sensor 14, or display 15 (if the display is a touch screen display).

In response to user input, the selected web link may optionally be broadcast to a social networking site based upon the account access data for the authenticated finger (Block 27) by the processor 13 in cooperation with the transceiver 16. For example, the selected web link may be broadcast to a user's "wall" or a user's friends on Facebook®. This allows the user to quickly and easily share a web link of interest with friends, relatives, colleagues, and acquaintances on a social networking site. Block 28 indicates the end of the operation.

Figure 3:
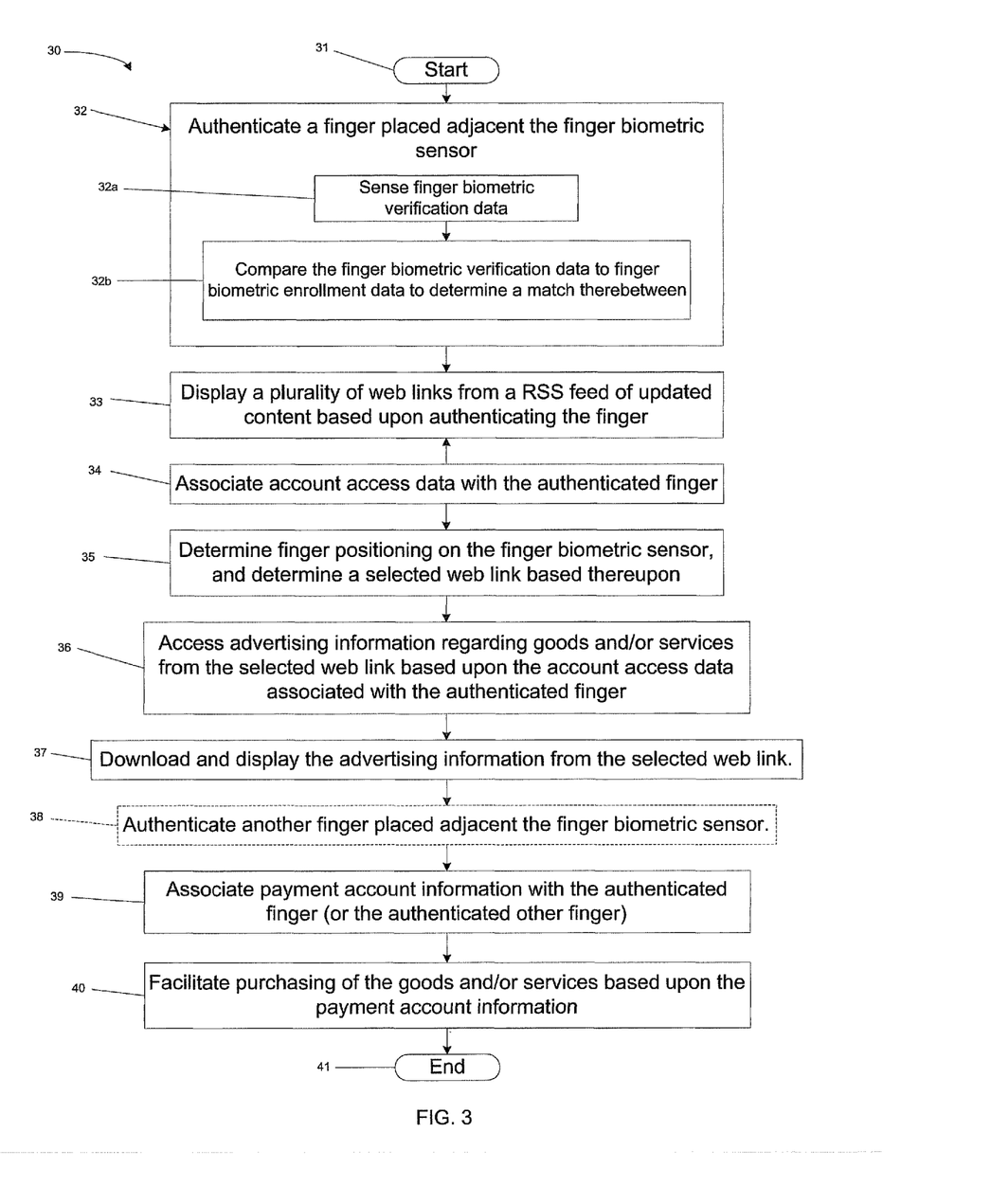
FIG. 3 is a more detailed flowchart illustrating operation of the electronic device of FIG. 1.

With reference to the flowchart 30 illustrated in FIG. 3, operation of the electronic device 12 in further detail is now described. After start of operation of the electronic device 12 (Block 31), the processor 13 cooperates with the finger biometric sensor 14 to authenticate a finger placed adjacent the finger biometric sensor (Block 32). More particularly, finger biometric verification data about a finger placed adjacent the finger biometric sensor 14 is sensed (Block 32a). Next, the processor 13 compares the finger biometric verification data to finger biometric enrollment data to determine a match therebetween (Block 32b). The finger biometric enrollment data may be stored in the memory 17 or may alternatively be stored by the remote server 18. The matching may be performed by typical fingerprint matching algorithms as known to those of skill in the art.

A plurality of web links from a RSS feed of updated content are displayed on the display 15, by the processor 13, based upon authentication of the finger placed adjacent the finger biometric sensor 14 (Block 33). As explained above, the plurality of web links may be displayed in response to authentication of the identify of the user via the finger biometric sensor 14, so that no web links would be displayed to an unauthorized user, or different web links would be displayed to different users. Further, the plurality of web links may additionally or alternatively be displayed in response to authentication of the finger via the finger biometric sensor 14, so that the web links displayed (and/or the web feed accessed) depend upon which finger was placed adjacent the finger biometric sensor. For example, authentication of a given user's index finger may result in a plurality of web links of a first RSS feed being displayed, while authentication of that user's thumb may result in a plurality of web links of a second RSS feed being displayed.

The processor 13 associates account access data (stored in the memory 17) with the authenticated finger (Block 34). As also explained above, the account access data may include a user name and password. In addition, the account access data may also include an account number or any other information used to access an account of the user associated with at least one of the plurality of web links. Skilled artisans will understand that access data for multiple accounts may be associated with a given authenticated finger, and that some of that access data may be for a web link not included in the plurality thereof.

Next, the processor 13 determines finger positioning on the finger biometric sensor 14 and determines a selected web link based thereupon (Block 35). More particularly, the physical position of the finger on the finger biometric sensor 14 may be determined, finger motion patterns across the finger biometric sensor 14 may be determined, or both may be determined. To determine finger motion patterns, the processor 13 may cooperate with the finger biometric sensor 14 for generating a series of successive image samples and for generating finger movement signals based upon the successive image samples.

Therefore, in this step, the finger biometric sensor 14 is acting as an additional input device to accept user input typically taken via a touchpad, trackball, or touch sensitive screen. This may advantageously conserve space, allowing the size of the electronic device 12 to be smaller than it would otherwise be if an additional input device were required.

Advertising information regarding goods and/or services from the selected web link is then accessed based upon the account access data associated with the authenticated finger (Block 36) by the processor 13. That is, the user's account with an online "store" is accessed. The advertising information may include pictures and descriptions of items and services for purchase together with a price therefore. The advertising information may also include audio and visual components, such as a might be contained in a video commercial.

The account access data may be automatically communicated to the web site associated with the selected web link upon selection thereof. Alternatively, the finger may be re-authenticated after selection of the web link and the account access data may be communicated to the web site associated with the selected web link thereafter.

The advertising information from the selected web link is downloaded and displayed on the display 15 (Block 37) by the processor 13 in cooperation with the transceiver 16. Another finger placed adjacent the finger biometric sensor 14 may optionally be authenticated (Block 38). Payment account information is associated with the authenticated finger, or the other finger if it was authenticated (Block 39). The payment account may be the user's bank account, credit card account, gift card account, or loyalty card reward account, as will be appreciated by those skilled in the art.

The processor 13 facilitates purchasing of the goods and/or services, in response to user input received via the input device 18, finger biometric sensor 14, and/or display 15 (if a touch sensitive display) based upon the payment account information (Block 39). Thus, the processor 13 places an order for the desired goods and/or services with the merchant represented by the web site associated with the selected web link, and effectuates payment of the merchant by the user if necessary or desired. The processor 13 may automatically effectuate payment after being ordered by the user to purchase the goods and/or services, or may wait for the user to place a finger adjacent the finger biometric sensor 14, authenticate the finger, and then effectuate payment from a payment account associated with that authenticated finger. Those of skill in the art will appreciate that this allows for different payment accounts to be linked to different fingers, and that a user may therefore quickly and easily choose which account to purchase the goods and/or services from by placing the corresponding finger adjacent the finger biometric sensor 14. Block 40 indicates the end of the operation of the electronic device 12.

Figure 4:
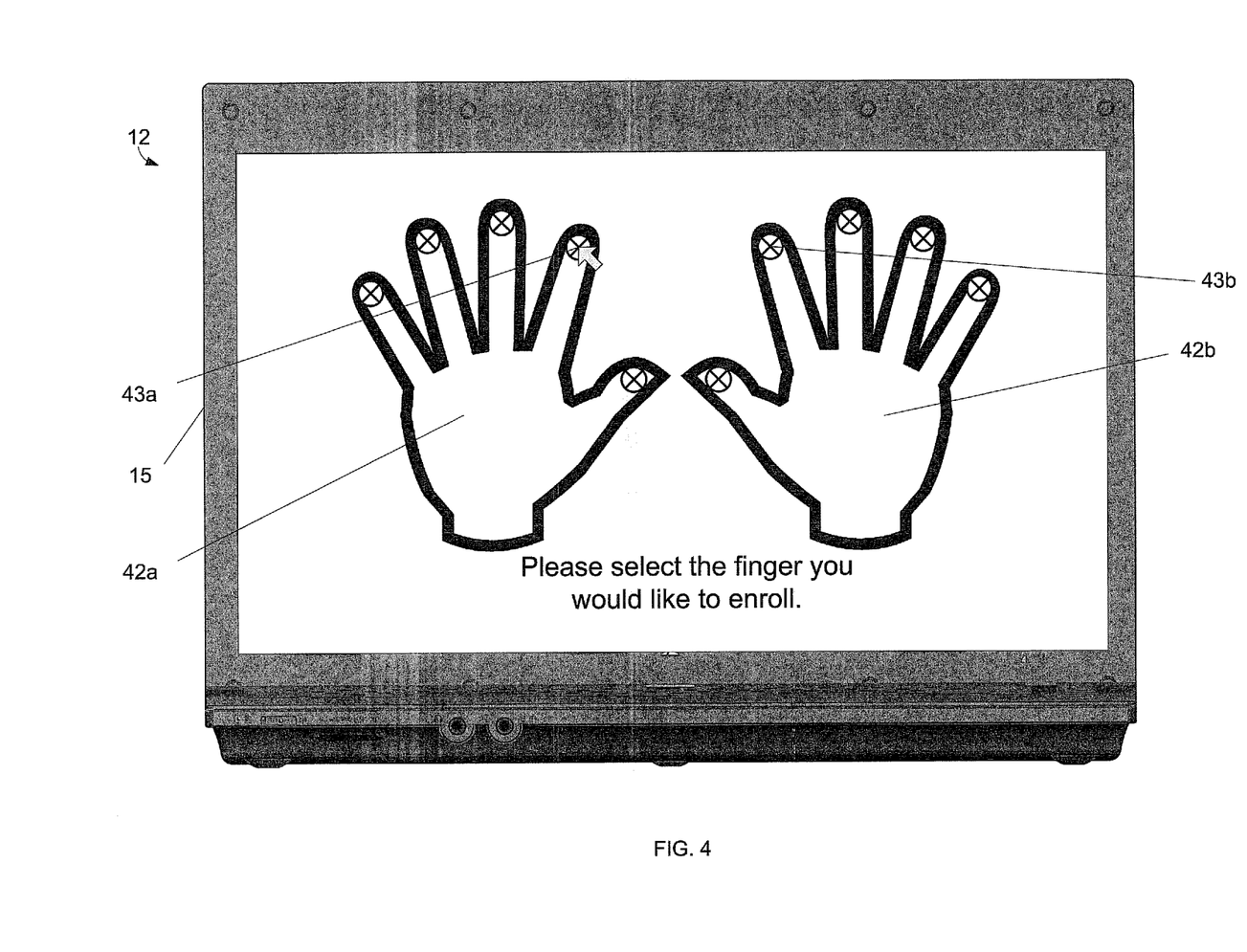
FIG. 4 is a front elevational view of the electronic device of FIG. 1 during an enrollment process.
Figure 5:
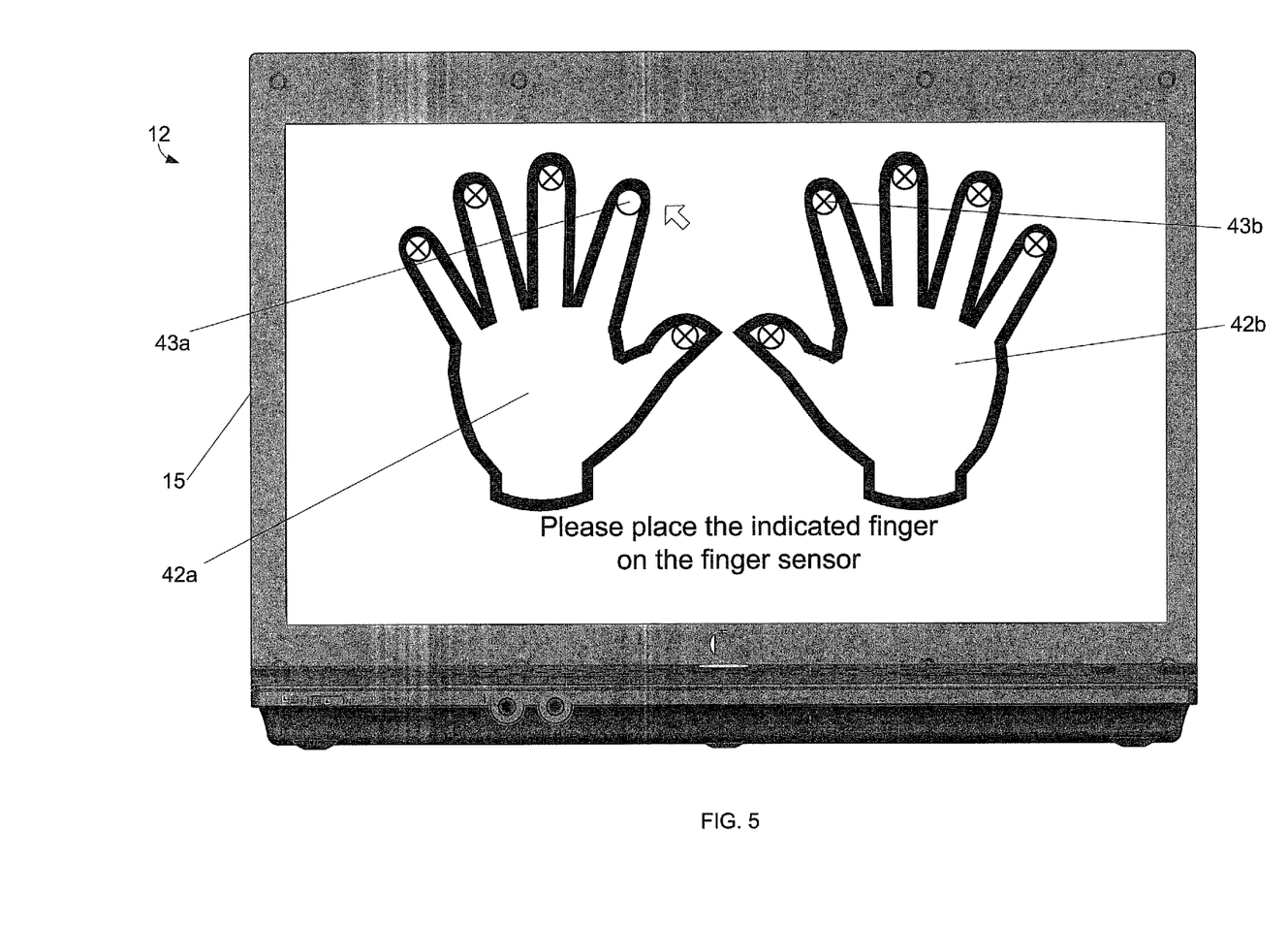
FIG. 5 is a front elevational view of the electronic device of FIG. 1 during a further step of the enrollment process.

An enrollment process wherein the enrollment data is stored in the memory 17 is now described with reference to FIGS. 4-5. As shown, the electronic device 12 is a laptop computer. Here, the display 15 is prompting the user to select a finger to enroll, and the left forefinger 43a is being selected by the user. After selecting the left forefinger 43a, the user is next prompted to place that finger on the finger sensor (FIG. 5).

Figure 6:
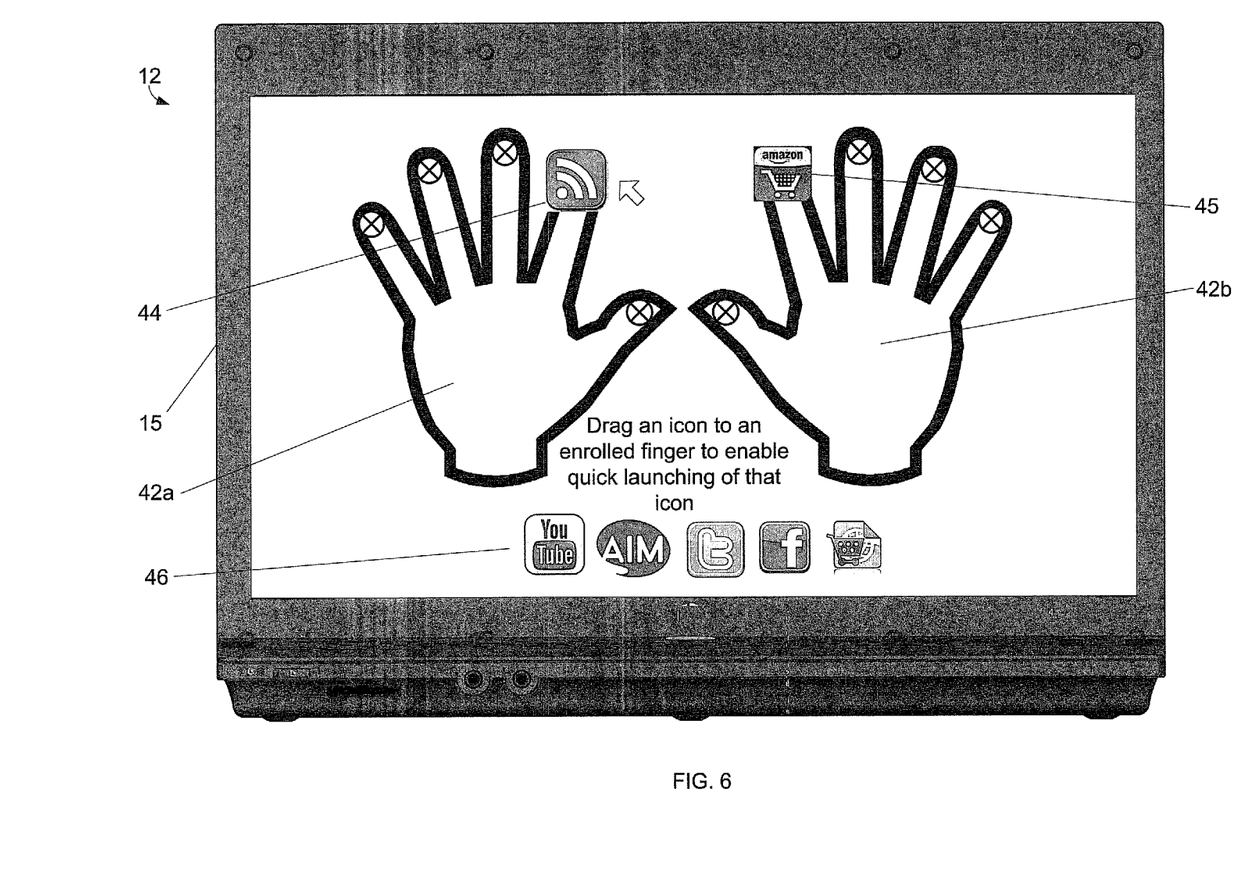
FIG. 6 is a front elevational view of the electronic device of FIG. 1 during a web feed/finger association process.

A process by which a given finger is associated with a web feed is now described with reference to FIG. 6. As shown, the display 15 is prompting the user to drag an icon (representing a web feed) to an enrolled finger to enable quick launching of that icon. That is, the user is prompted to associate the web feed with the enrolled finger. Here, the user has dragged a news feed icon 44 to the left forefinger 43a, and an amazon.com icon to the right forefinger 43b.

Figure 7:
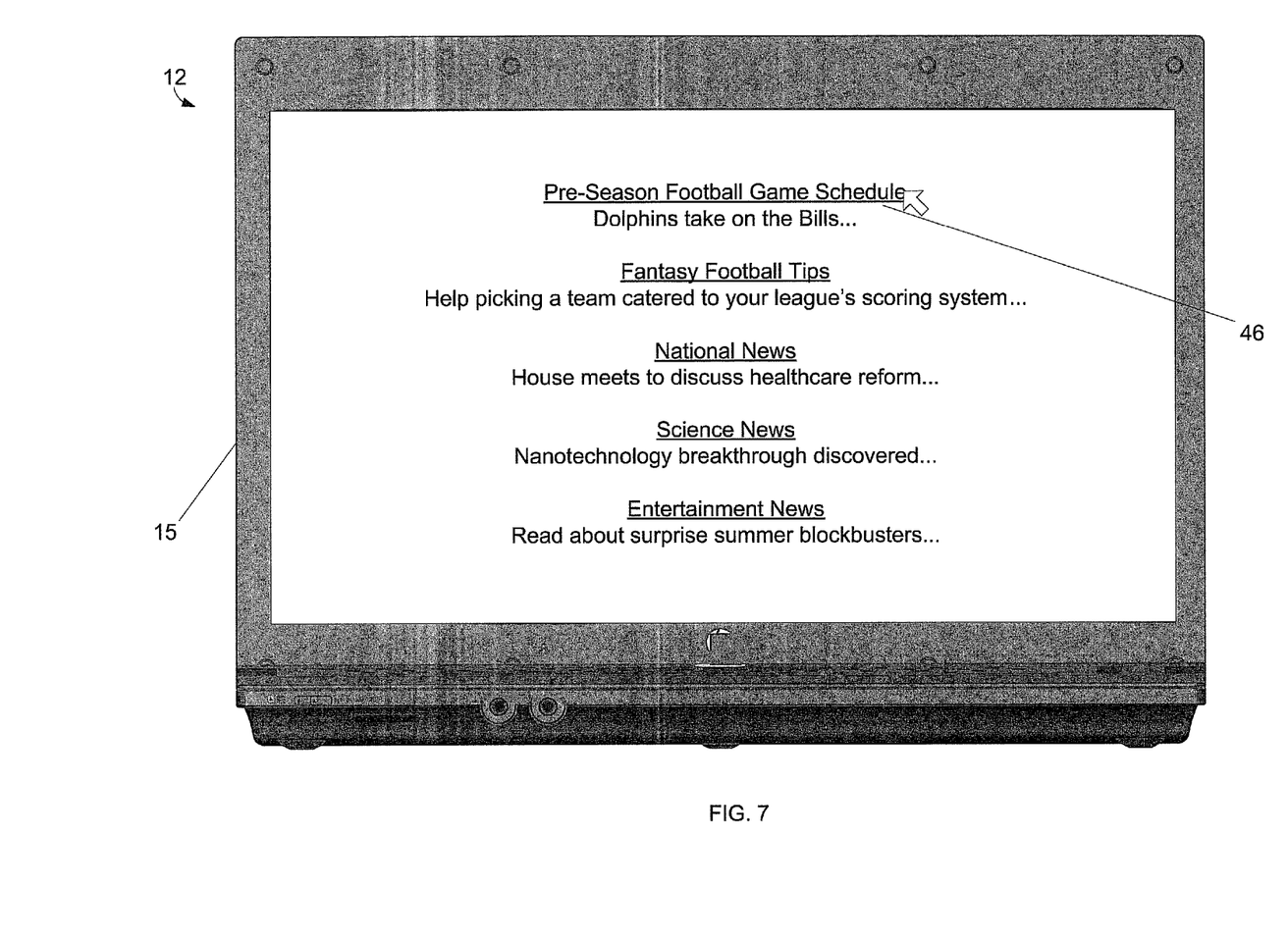
FIG. 7 is a front elevational view of the electronic device of FIG. 1 displaying a plurality of web links.
Figure 8:
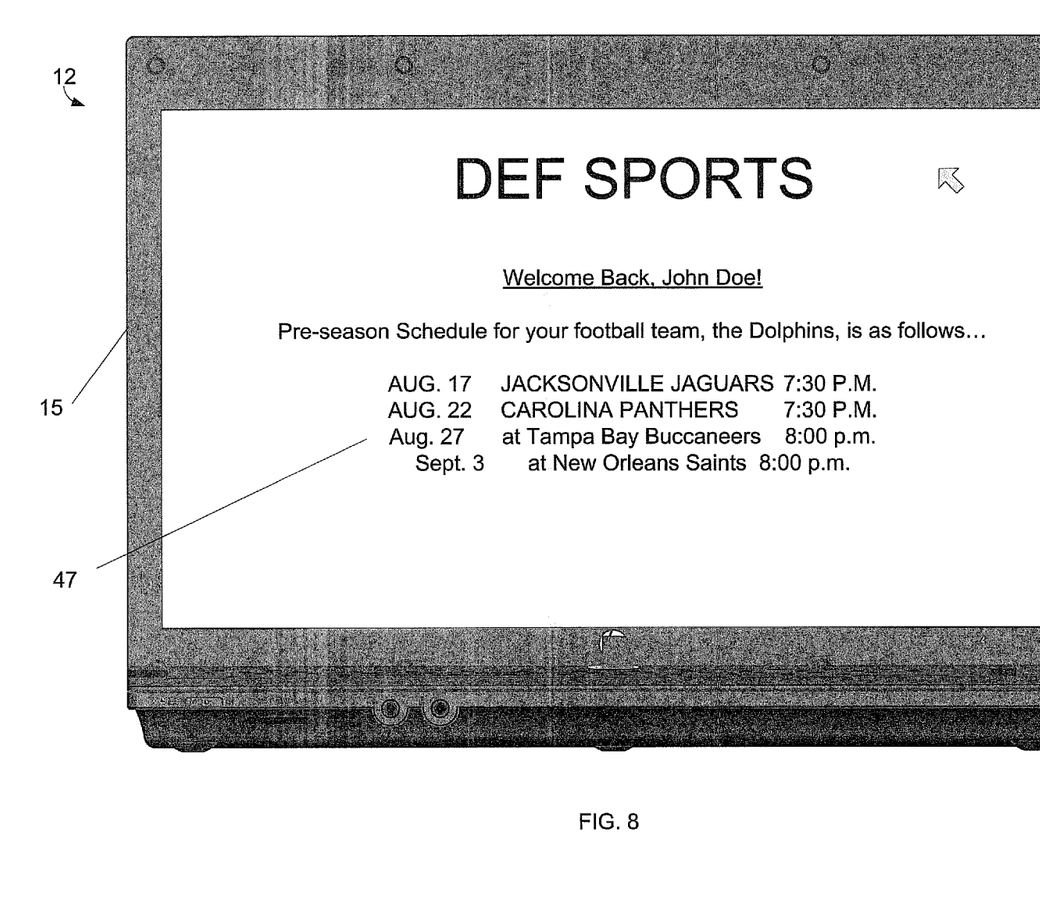
FIG. 8 is a front elevational view of the electronic device of FIG. 1 displaying a selected web link based upon account access information associated with a finger.

Operation of the electronic device 12 after the enrollment and association process is now described with reference to FIGS. 7-8. The display 15 is displaying a plurality of news web links 46 in response to the user having placed his left forefinger adjacent the finger biometric sensor 14 and the electronic device 12 having authenticated that finger (FIG. 7). As shown, the user has chosen to select the web link titled "Pre-Season Football Game Schedule."

After user selection of the web link, the electronic device 12 downloads information therefrom based upon user account information associated with the finger and displays the information on the display 15. Here, the information is the pre-season schedule for the Miami Dolphins football team 14 (FIG. 8). As shown, the DEF Sports web site says "Welcome Back, John Doe!" indicating that the electronic device 12 has logged into the user's account at the DEF Sports web site.

Figure 9:
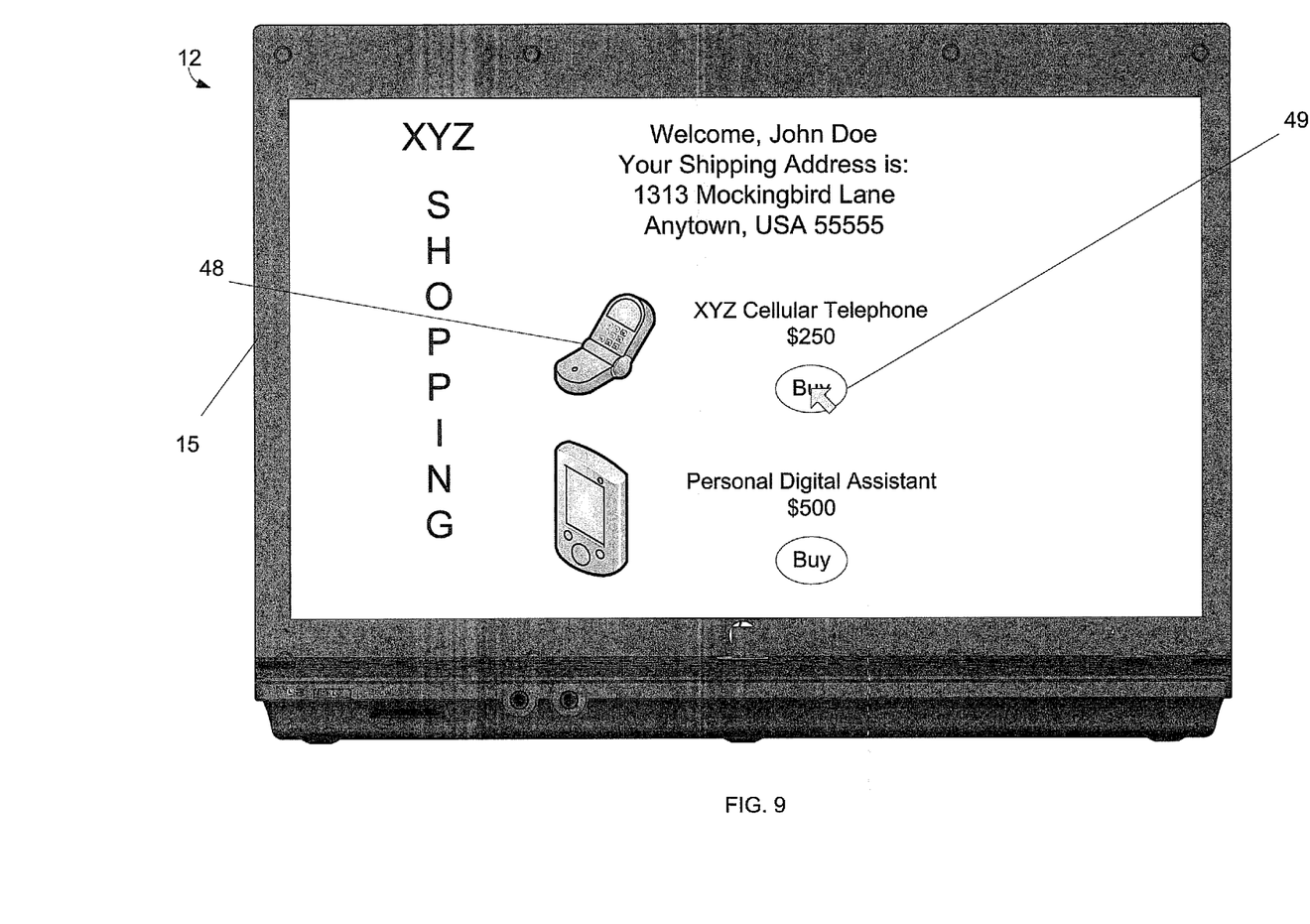
FIG. 9 is a front elevational view of the electronic device of FIG. 1 displaying a plurality of web links corresponding to advertising information for goods.
Figure 10:
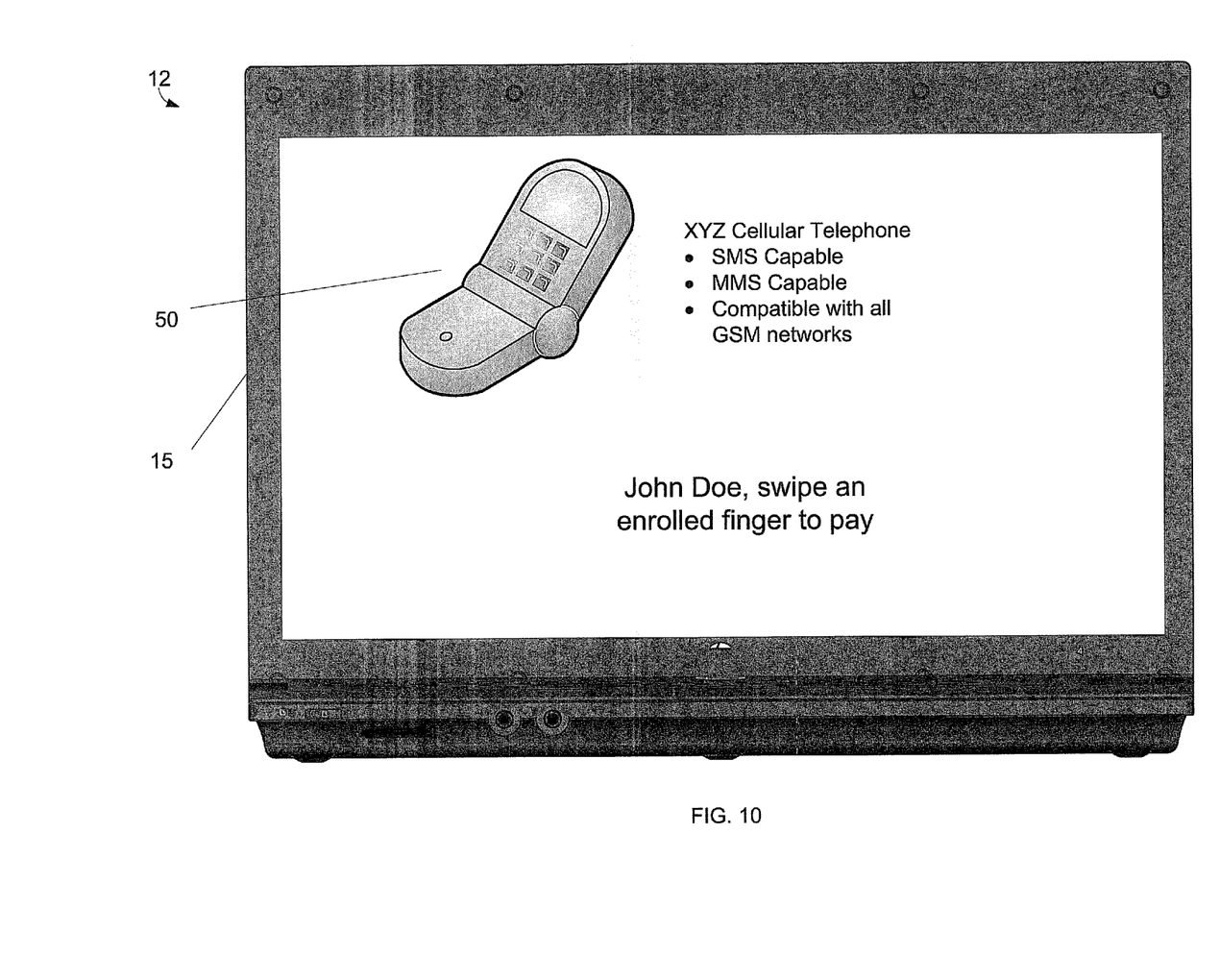
FIG. 10 is a front elevational view of the electronic device of FIG. 1 displaying the purchasing of goods.

The web feed may also be a web site offering goods and/or services for purchase. Such an example is shown in FIG. 9, where XYZ Shopping web site says "Welcome, John Doe," and reminds the user that "Your Shipping Address is: 1313 Mockingbird Lane, Anytown, USA 55555," indicating that the electronic device 12 has logged into the user's account at XYS Shopping. The web site is illustratively offering the XYZ Cellular Telephone 48 for sale, and the user is selecting a purchase link 49 indicating that he would like to buy the XYZ Cellular Telephone. Once the purchase link 49 has been selected, the electronic device 12 loads and displays a purchase web site 50, illustratively showing further features of the XYZ Cellular Telephone. The purchase web site 50 is prompting the user to "swipe an enrolled finger to pay," (FIG. 10).

Figure 11:
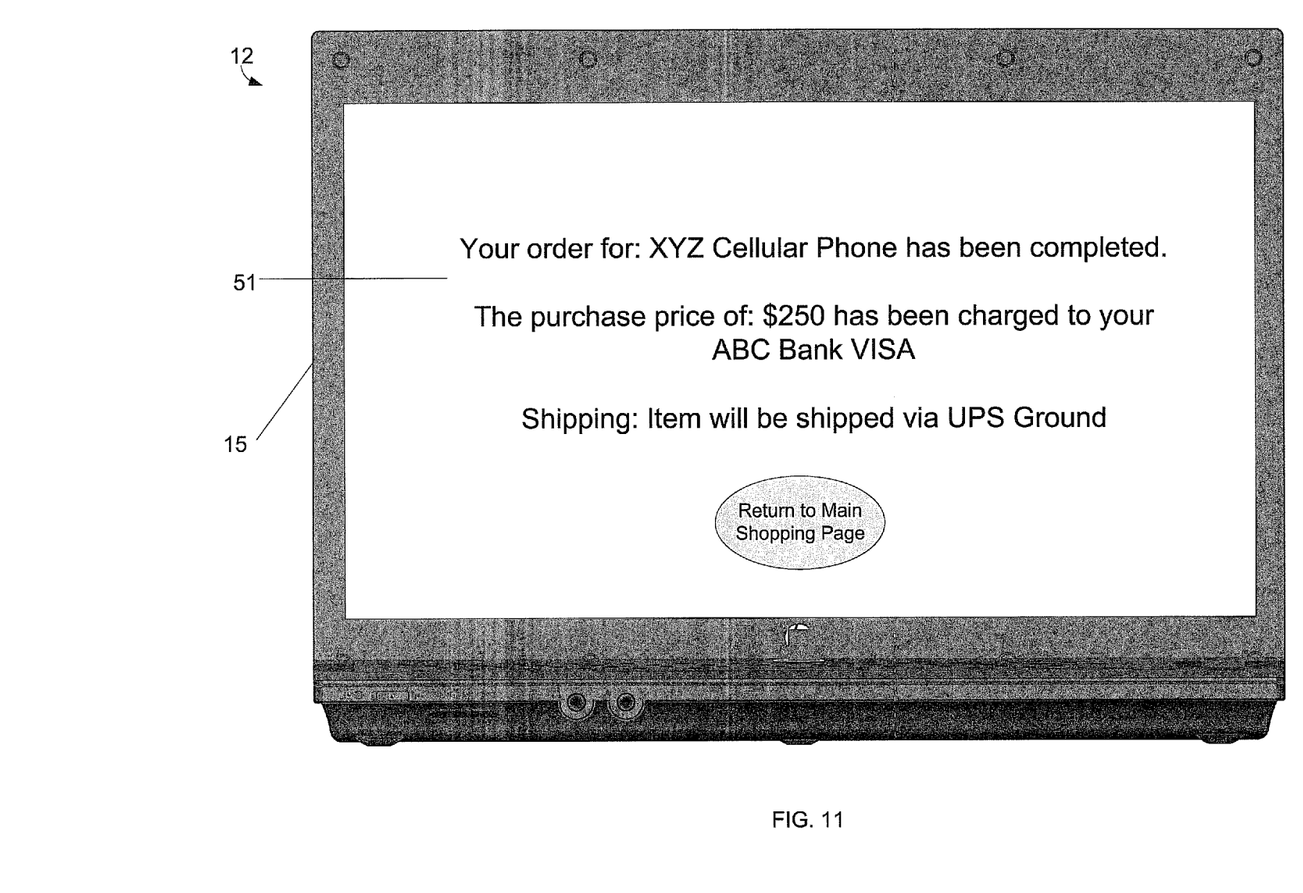
FIG. 11 is a front elevational view of the electronic device of FIG. 1 displaying a message indicating that the goods have been purchased.

Here, the electronic device 12 has associated payment account access data with at least one enrolled finger of the user, and, will facilitate the purchase of the XYZ Cellular Telephone based on that payment account access data. This advantageously speeds up the process of purchasing goods and/or services from a web site, as the user will not have to enter payment information manually. Rather, a simple swipe of an enrolled finger that is associated with the payment account will effectuate payment for the goods and/or services. An order confirmation web page 51 is displayed on the electronic device 12 after the enrolled finger is swiped (FIG. 11). This page alerts the user that the order for the XYZ Cellular Phone has been received and that the purchase price has been charged to the user's ABC Bank VISA payment account.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
    a finger biometric sensor;
    a touch screen display;
    a hardware processor coupled with said finger biometric sensor and said touch screen display, and configured to
        display a plurality of finger representations on said touch screen display corresponding to different fingers of a hand,
        enroll respective user's fingers for the plurality of finger representations using said finger biometric sensor,
        display a menu of available functions on said touch screen display comprising a plurality of different icons each corresponding to a respective available function,
        associate an icon corresponding to a given function with a respective finger representation on said touch screen display by dragging the icon on the touch screen display, and
        performing a given function based upon a match of a newly sensed user's finger with a respective enrolled user's finger using said finger biometric sensor.

2. The electronic device of claim 1 wherein said hardware processor is further configured to display a prompt on said touch screen display to place a finger corresponding to a given finger representation adjacent said finger biometric sensor for enrollment.

3. The electronic device of claim 1 wherein at least one of the functions comprises opening a Really Simple Syndication (RSS) feed.

4. The electronic device of claim 1 wherein the at least one function comprises opening a Web link for a social networking site.

5. The electronic device of claim 1 wherein at least one of the functions comprises purchasing of at least one of goods and services.

6. The electronic device of claim 5 wherein said hardware processor facilitates purchasing based upon a payment account.

7. The electronic device of claim 6 wherein said hardware processor also associates the payment account with the authenticated finger.

8. The electronic device of claim 1 wherein said hardware processor authenticates the newly sensed user's finger by sensing a set of finger biometric verification data using said finger biometric sensor and comparing the set of finger biometric verification data to a set of finger biometric enrollment data to determine a match therebetween.

9. An electronic device comprising:
    a finger biometric sensor;
    a touch screen display;
    a hardware processor coupled with said finger biometric sensor and said touch screen display, and configured to
        display a plurality of finger representations on said touch screen display corresponding to different fingers of a hand,
        enroll respective user's fingers for the plurality of finger representations using said finger biometric sensor,
        display a plurality of different icons on said touch screen display each corresponding to a respective available function from among a plurality of different available functions, at least one of the functions comprising opening a Web link,
        associate an icon corresponding to a given function with a respective finger representation on said touch screen display by dragging the icon on the touch screen display, and
        perform a given function based upon a match of a newly sensed user's finger with a respective enrolled user's finger using said finger biometric sensor.

10. The electronic device of claim 9 wherein said hardware processor is further configured to display a prompt on said touch screen display to place a finger corresponding to a given finger representation adjacent said finger biometric sensor for enrollment.

11. The electronic device of claim 9 wherein at least one of the functions comprises opening a Really Simple Syndication (RSS) feed.

12. The electronic device of claim 9 wherein the at least one function comprises opening a Web link for a social networking site.

13. The electronic device of claim 9 wherein at least one of the functions comprises purchasing of at least one of goods and services.

14. A method for using an electronic device comprising a finger biometric sensor and a touch screen display, the method comprising:
    displaying a plurality of finger representations on the touch screen display corresponding to different fingers of a hand;
    enrolling respective user's fingers for the plurality of finger representations using the finger biometric sensor;
    displaying a menu of available functions on the touch screen display comprising a plurality of different icons each corresponding to a respective available function, at least one of the functions comprising opening a Web link;

associating an icon corresponding to a given function with a respective finger representation on said touch screen display by dragging the icon on the touch screen display; and performing a given function based upon a match of a newly sensed user's finger with a respective enrolled user's finger using the finger biometric sensor.

15. The method of claim 14 further comprising displaying a prompt on the touch screen display to place a finger corresponding to a given finger representation adjacent the finger biometric sensor for enrollment.

16. The method of claim 14 wherein at least one of the functions comprises opening a Really Simple Syndication (RSS) feed.

17. The method of claim 14 wherein the at least one function comprises opening a Web link for a social networking site.

18. The method of claim 14 wherein at least one of the functions comprises purchasing of at least one of goods and services.

* * * * *